United States Patent
Taira et al.

(10) Patent No.: US 12,032,384 B2
(45) Date of Patent: Jul. 9, 2024

(54) ROBOT CONTROL SYSTEM, ROBOT CONTROL METHOD, AND CONTROL PROGRAM

(71) Applicant: TOYOTA JIDOSHA KABUSHIKI KAISHA, Toyota (JP)

(72) Inventors: Tetsuya Taira, Nagakute (JP); Shiro Oda, Anjo (JP); Satoshi Toyoshima, Okazaki (JP); Yuta Watanabe, Toyota (JP); Takeshi Matsui, Nisshin (JP); Takayoshi Nasu, Okazaki (JP); Kei Yoshikawa, Nagoya (JP); Yusuke Ota, Nagakute (JP); Yutaro Ishida, Toyota (JP); Yuji Onuma, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 151 days.

(21) Appl. No.: 17/542,633

(22) Filed: Dec. 6, 2021

(65) Prior Publication Data

US 2022/0253069 A1    Aug. 11, 2022

(30) Foreign Application Priority Data

Feb. 9, 2021   (JP) ................................ 2021-018734

(51) Int. Cl.
   *G05D 1/00*   (2024.01)
(52) U.S. Cl.
   CPC ......... *G05D 1/0253* (2013.01); *G05D 1/0274* (2013.01)

(58) Field of Classification Search
None
See application file for complete search history.

(56) References Cited

U.S. PATENT DOCUMENTS

| | | | |
|---|---|---|---|
| 2019/0051193 A1* | 2/2019 | Gutierrez | G08G 5/0021 |
| 2019/0218060 A1 | 7/2019 | Koba et al. | |
| 2020/0072619 A1 | 3/2020 | Fukui | |
| 2021/0046650 A1* | 2/2021 | Deyle | G05D 1/246 |
| 2021/0114218 A1* | 4/2021 | Kim | G05D 1/0214 |
| 2021/0276730 A1* | 9/2021 | Jha | B64D 47/06 |
| 2021/0339399 A1* | 11/2021 | Schluntz | B25J 9/1697 |

FOREIGN PATENT DOCUMENTS

| | | |
|---|---|---|
| JP | H06009182 A | 1/1994 |
| JP | 2020109039 A | 7/2020 |
| JP | 2020125198 A | 8/2020 |
| WO | 2014156458 A1 | 10/2014 |
| WO | 2018066054 A1 | 4/2018 |
| WO | 2018189770 A1 | 10/2018 |

* cited by examiner

*Primary Examiner* — Joseph M Rocca
*Assistant Examiner* — Arslan Azhar
(74) *Attorney, Agent, or Firm* — Dickinson Wright, PLLC

(57) ABSTRACT

A robot control system according to an embodiment is a robot control system that controls a mobile robot configured to be able to move autonomously inside a facility. When the mobile robot moves from a first area inside the facility to a second area through a partition configured to be openable and closable, a moving route of the mobile robot is set based on the mobile robot that is determined from an image captured by a first camera that photographs the first area and an obstacle that is determined from an image captured by a second camera that photographs the second area.

13 Claims, 11 Drawing Sheets

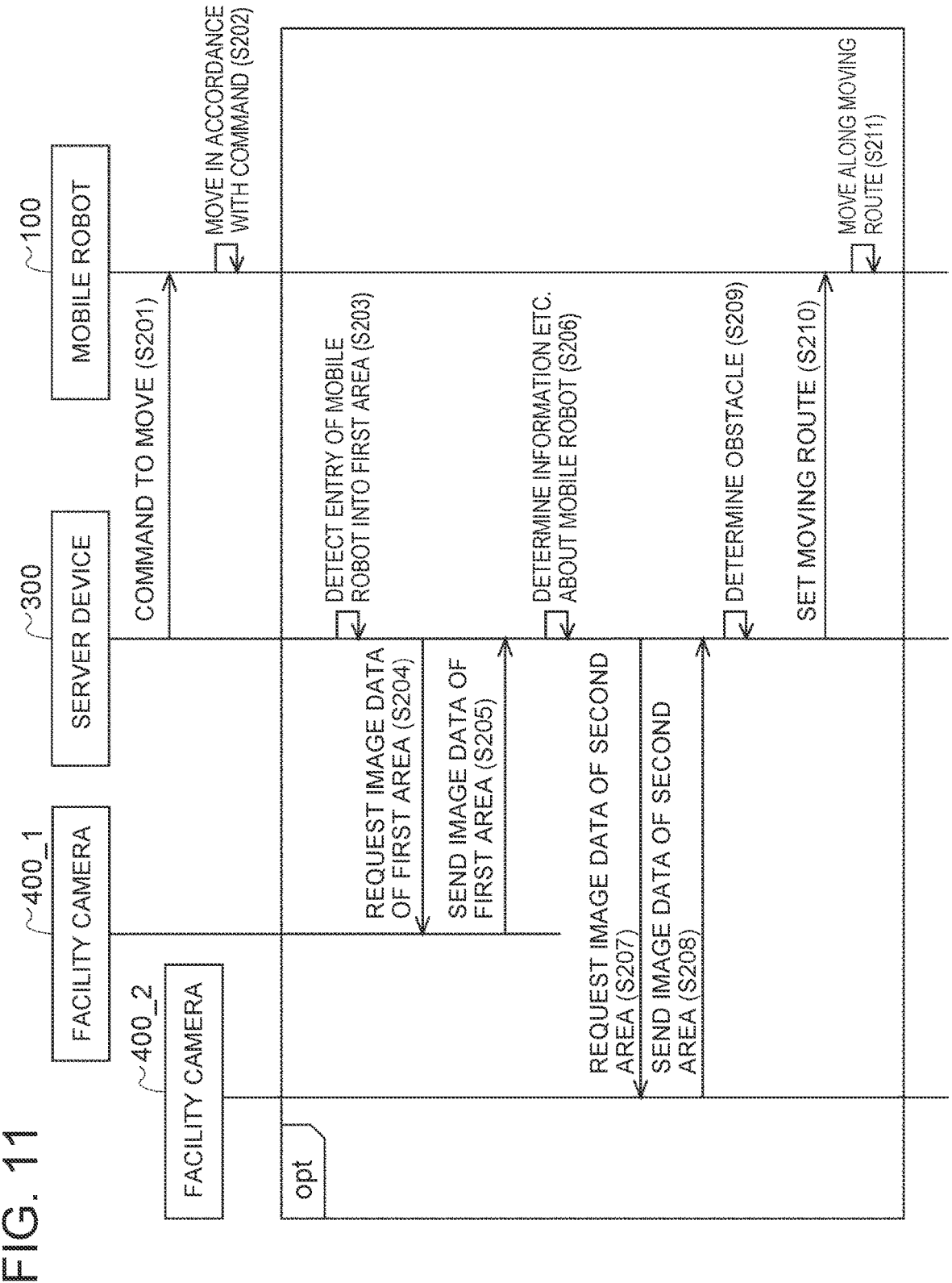

ROBOT CONTROL SYSTEM, ROBOT CONTROL METHOD, AND CONTROL PROGRAM

CROSS-REFERENCE TO RELATED APPLICATION

This application claims priority to Japanese Patent Application No. 2021-018734 filed on Feb. 9, 2021, incorporated herein by reference in its entirety.

BACKGROUND

1. Technical Field

This disclosure relates to a robot control system, a robot control method, and a control program.

2. Description of Related Art

In recent years, development of a mobile robot that moves autonomously inside a facility, such as a hospital, to perform a task like delivering an article, and a robot control system that controls such a mobile robot has been advanced.

A technology concerned with a mobile robot is disclosed, for example, in Japanese Unexamined Patent Application Publication No. 2020-125198 (JP 2020-125198 A). The elevator system disclosed in JP 2020-125198 A includes: an in-car camera; an object region extraction unit that extracts regions occupied by an autonomously movable body and an object that is other than the autonomously movable body based on a camera image acquired by the in-car camera; an autonomously movable body riding position calculation unit that calculates a position inside the car at which the autonomously movable body is to ride; and a moving route calculation unit that calculates, from the object regions, such a route that the autonomously movable body does not come into contact with other objects.

SUMMARY

In the configuration of JP 2020-125198 A, information about the autonomously movable body outside the elevator before it gets into the car of the elevator cannot be accurately grasped, so that, for example, when the position of the autonomously movable body shifts or an article being carried protrudes, the autonomously movable body may fail to avoid obstacles. Thus, a problem remains that the configuration of JP 2020-125198 A cannot allow the autonomously movable body to move efficiently.

This disclosure has been made in view of these circumstances, and an object thereof is to provide a robot control system, a robot control method, and a control program that can allow a mobile robot to move efficiently.

A robot control system according to an embodiment is a robot control system that controls a mobile robot configured to be able to move autonomously inside a facility. When the mobile robot moves from a first area inside the facility to a second area through a partition configured to be openable and closable, a moving route of the mobile robot is set based on the mobile robot that is determined from an image captured by a first camera that photographs the first area and an obstacle that is determined from an image captured by a second camera that photographs the second area. In this robot control system, an obstacle in the second area that is visually unrecognizable by a built-in camera of the mobile robot can be determined from an image captured by the second camera that photographs the second area. Therefore, a moving route that allows the mobile robot to move from the first area to the second area so as to avoid the obstacle can be set for the mobile robot beforehand. Further, in this robot control system, information about the mobile robot located in the first area (e.g., any positional shift of the mobile robot, and any protrusion and the outer shape of an article being carried) can be accurately grasped from an image captured by the first camera that photographs the first area. Therefore, a more accurate moving route that is suitable for the mobile robot to move so as to avoid the obstacle can be set for the mobile robot. Thus, this robot control system can allow the mobile robot to move efficiently while avoiding obstacles.

The moving route of the mobile robot may be set based on at least one of the position of the mobile robot, the shape of the mobile robot, and an article being carried by the mobile robot that are determined from an image captured by the first camera.

The moving route of the mobile robot may be set based on the mobile robot determined from an image captured by the first camera and the obstacle determined from an image captured by the second camera, and additionally on an obstacle in the first area that is determined from an image captured by the first camera.

One or both of the first camera and the second camera may be cameras that are installed inside the facility.

One or both of the first camera and the second camera may be cameras that are mounted on a mobile robot other than the mobile robot.

The moving route of the mobile robot may be set so as to avoid the obstacle determined from an image captured by the second camera and an expected moving route of the obstacle.

The mobile robot may be stopped from moving to the second area when the obstacle determined from an image captured by the second camera is a predetermined number or a larger number of people.

The mobile robot may be stopped from moving to the second area when the obstacle determined from an image captured by the second camera is an object that occupies a predetermined proportion or a higher proportion of the second area.

The mobile robot may be stopped from moving to the second area when the obstacle determined from an image captured by the second camera is a predetermined obstacle.

The mobile robot may be moved to the second area when the obstacle has moved to the outside of the second area.

The first area may be the inside of a car of an elevator; the second area may be an elevator hall in front of the elevator; and the partition may be a door of the elevator.

The first area may be an elevator hall in front of an elevator; the second area may be the inside of a car of the elevator; and the partition may be a door of the elevator.

When the obstacle determined from an image captured by the second camera is a person, the person may be notified that the mobile robot is going to move to the second area.

The robot control system may further includes a control device that controls the mobile robot. In this case, when moving the mobile robot from the first area inside the facility to the second area through the partition configured to be openable and closable, the control device sets the moving route of the mobile robot based on the mobile robot that is determined from an image captured by the first camera that photographs the first area and the obstacle that is determined from an image captured by the second camera.

A robot control method according to an embodiment includes the steps of: determining a mobile robot configured to be able to move autonomously that is present in a first area inside a facility, from an image captured by a first camera that photographs the first area; determining an obstacle in a second area that is adjacent to the first area across a partition configured to be openable and closable, from an image captured by a second camera that photographs the second area; and setting a moving route of the mobile robot from the first area to the second area through the partition based on a result of determination in each of the first area and the second area. In this robot control method, an obstacle in the second area that is visually unrecognizable by a built-in camera of the mobile robot can be determined from an image captured by the second camera that photographs the second area. Therefore, a moving route that allows the mobile robot to move from the first area to the second area so as to avoid the obstacle can be set for the mobile robot beforehand. Further, in this robot control method, information about the mobile robot located in the first area (e.g., any positional shift of the mobile robot, and any protrusion and the outer shape of an article being carried) can be accurately grasped from an image captured by the first camera that photographs the first area. Therefore, a more accurate moving route that is suitable for the mobile robot to move so as to avoid the obstacle can be set for the mobile robot. Thus, this robot control method can allow the mobile robot to move efficiently while avoiding obstacles.

A control program according to an embodiment causes a computer to execute: a process of determining a mobile robot configured to be able to move autonomously that is present in a first area inside a facility, from an image captured by a first camera that photographs the first area; a process of determining an obstacle in a second area that is adjacent to the first area across a partition configured to be openable and closable, from an image captured by a second camera that photographs the second area; and a process of setting a moving route of the mobile robot from the first area to the second area through the partition based on a result of determination in each of the first area and the second area. In this control program, an obstacle in the second area that is visually unrecognizable by a built-in camera of the mobile robot can be determined from an image captured by the second camera that photographs the second area. Therefore, a moving route that allows the mobile robot to move from the first area to the second area so as to avoid the obstacle can be set for the mobile robot beforehand. Further, in this control program, information about the mobile robot located in the first area (e.g., any positional shift of the mobile robot, and any protrusion and the outer shape of an article being carried) can be accurately grasped from an image captured by the first camera that photographs the first area. Therefore, a more accurate moving route that is suitable for the mobile robot to move so as to avoid the obstacle can be set for the mobile robot. Thus, this control program can allow the mobile robot to move efficiently while avoiding obstacles.

The present disclosure can provide a robot control system, a robot control method, and a control program that can allow a mobile robot to move efficiently.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 11 is a sequence chart illustrating the operation of the robot control system according to Embodiment 2.

DETAILED DESCRIPTION OF EMBODIMENTS

Figure 1:
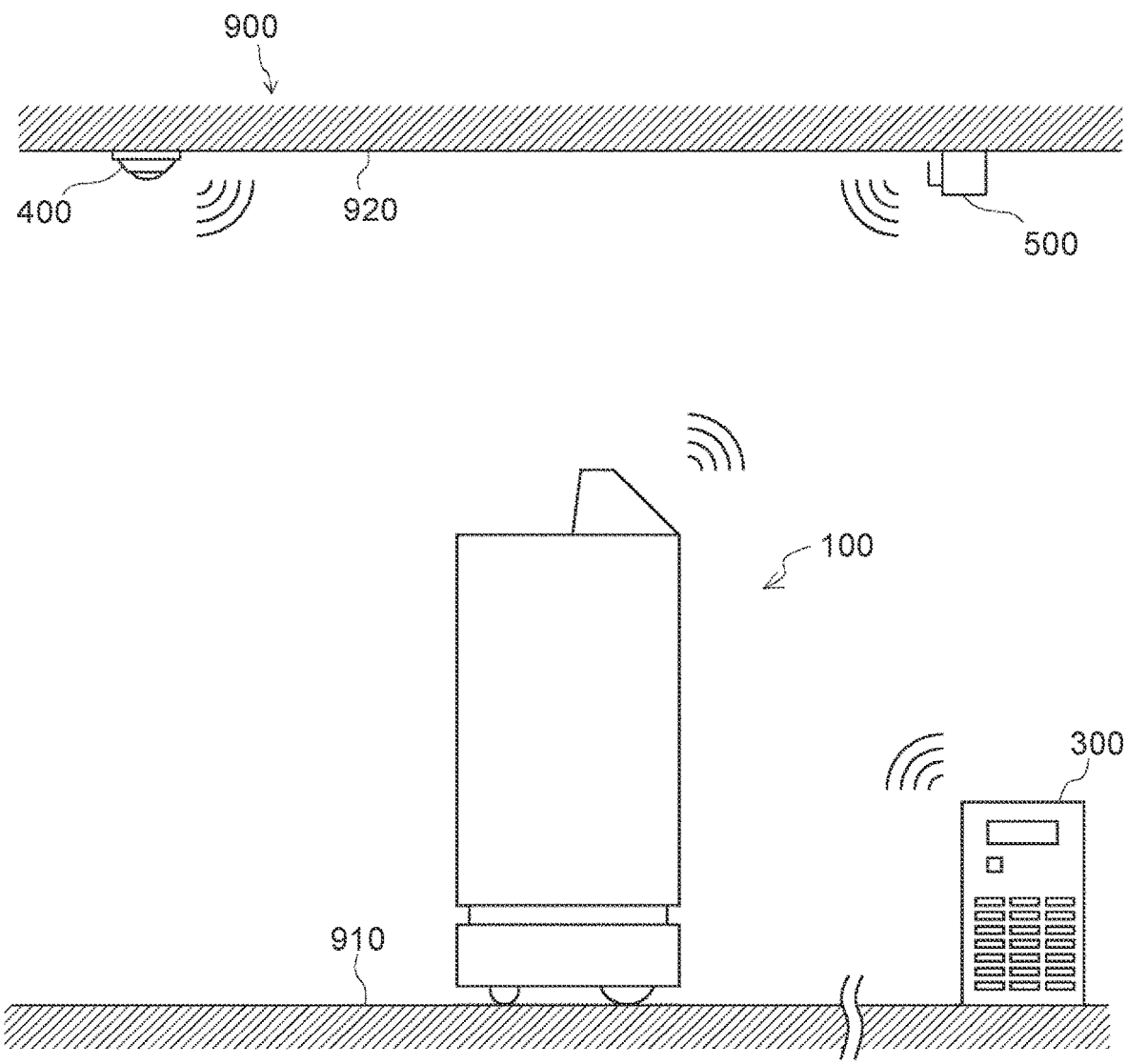
FIG. 1 is a schematic view illustrating a mobile robot that constitutes a robot control system according to Embodiment 1.

The present disclosure will be described below through embodiments of the disclosure, but it is not intended to limit the disclosure according to the claims to the following embodiments. Further, not all the components described in the embodiments are essential as means for achieving the object. To clarify the description, the following text and the drawings are partially omitted and simplified as necessary. The same elements in the drawings are denoted by the same reference signs, and an overlapping description thereof will be omitted as necessary.

Embodiment 1

In the following, a robot control system according to Embodiment 1 will be described.

The robot control system is a system that controls a mobile robot configured to be able to move autonomously inside a predetermined facility. The robot control system may be a single mobile robot, or may include one or more mobile robots and a server device (control device) that manages (controls) the mobile robots. The term "mobile robot" covers a delivery robot that moves autonomously to deliver an article. In this embodiment, a case where the robot control system is a single mobile robot will be described.

Configuration of Mobile Robot

FIG. 1 is a schematic view illustrating a mobile robot according to Embodiment 1. As shown in FIG. 1, a mobile robot 100 is configured to be able to move autonomously inside a predetermined facility 900. The predetermined facility 900 is, for example, a hospital. However, the predetermined facility 900 is not limited to a hospital but may be any facility where the mobile robot 100 can move autonomously, such as a hotel or a shopping mall. In this embodiment, the case where the predetermined facility 900 is a hospital will be described as an example.

The mobile robot 100 moves autonomously on a floor surface 910 inside the facility 900. A facility camera 400 is fixed inside the facility 900. For example, the facility camera 400 is fixed on a ceiling 920 of the facility 900 and creates image data by imaging the surroundings of the facility camera 400. A plurality of facility cameras 400 may be provided inside the facility 900.

The facility camera 400 may be installed so as to be able to photograph an elevator hall (a waiting space in front of an elevator). An image captured by the facility camera 400 is sent to the server device 300 and the mobile robot 100 that is, for example, about to move from the inside of a car of the elevator to the elevator hall, and is used for purposes such as determining an obstacle in the elevator hall that is visually unrecognizable by the mobile robot 100. Thus, a moving route suitable for the mobile robot 100 to move so as to avoid the obstacle can be set beforehand.

This captured image may be used for purposes such as determining information about the mobile robot 100 waiting in the elevator hall (e.g., any positional shift and the shape of the mobile robot 100, and any protrusion of an article being carried), and determining an obstacle present in an area that is located at a blind angle to the mobile robot 100 waiting in the elevator hall.

Further, the facility camera 400 may be installed so as to be able to photograph an inside of the car of the elevator. An image captured by this facility camera 400 is sent to the server device 300 and the mobile robot 100 that is, for example, about to move from the elevator hall into the car of the elevator, and is used for purposes such as determining an obstacle inside the car of the elevator that is visually unrecognizable by the mobile robot 100. Thus, a moving route suitable for the mobile robot 100 to move so as to avoid the obstacle can be set beforehand.

This captured image may be used for purposes such as determining information about the mobile robot 100 riding inside the car of the elevator (e.g., any positional shift and the shape of the mobile robot 100, and any protrusion of the article being carried), and determining an obstacle present in an area that is located at a blind angle to the mobile robot 100 riding inside the car of the elevator.

The mobile robot 100 and the facility camera 400 are connected to each other so as to be able to communicate through information transmission means, such as wireless communication. For example, the mobile robot 100 and the facility camera 400 may be connected to each other so as to be able to communicate directly, or may be connected to each other so as to be able to communicate through an access point 500 and a server device 300. The mobile robot 100 acquires image data from the facility camera 400, directly or through the access point 500 and the server device 300.

The access point 500 is, for example, a wireless LAN access point. The access point 500 is fixed inside the facility 900 and acquires, from the mobile robot 100 located around the access point 500, position information, travel information, etc. on the mobile robot 100. A plurality of access points 500 may be provided inside the facility 900.

A plurality of mobile robots 100 may move autonomously inside the facility 900. When a plurality of mobile robots 100 moves autonomously, these mobile robots 100 may be connected to one another so as to be able to communicate through information transmission means, such as wireless communication. The mobile robots 100 may be connected to one another so as to be able to communicate directly, or may be connected to one another so as to be able to communicate through the access point 500 and the server device 300.

Figure 2:
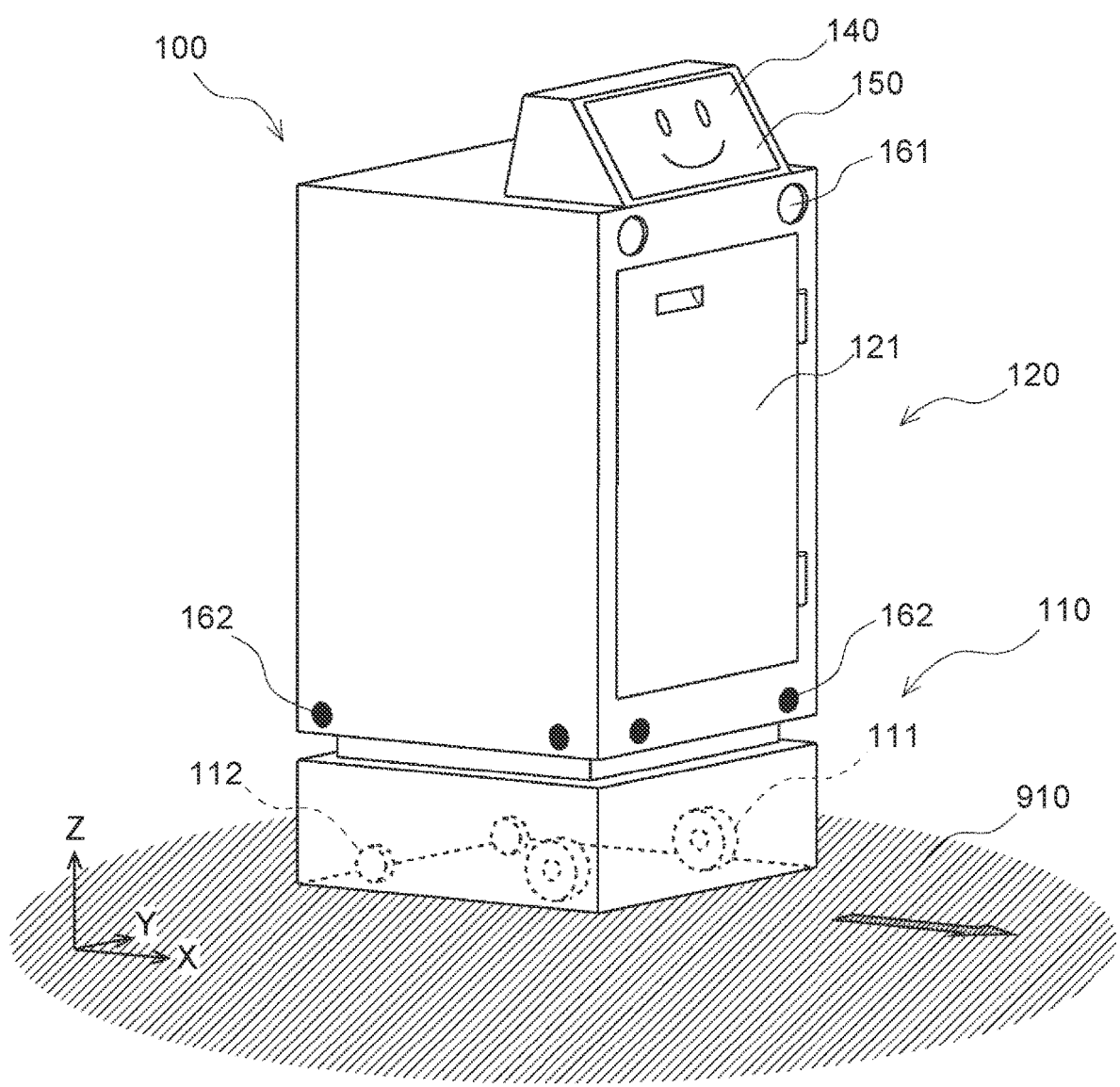
FIG. 2 is a perspective view illustrating the mobile robot according to Embodiment 1.

FIG. 2 is a perspective view illustrating the mobile robot 100 according to Embodiment 1.

Figure 3:
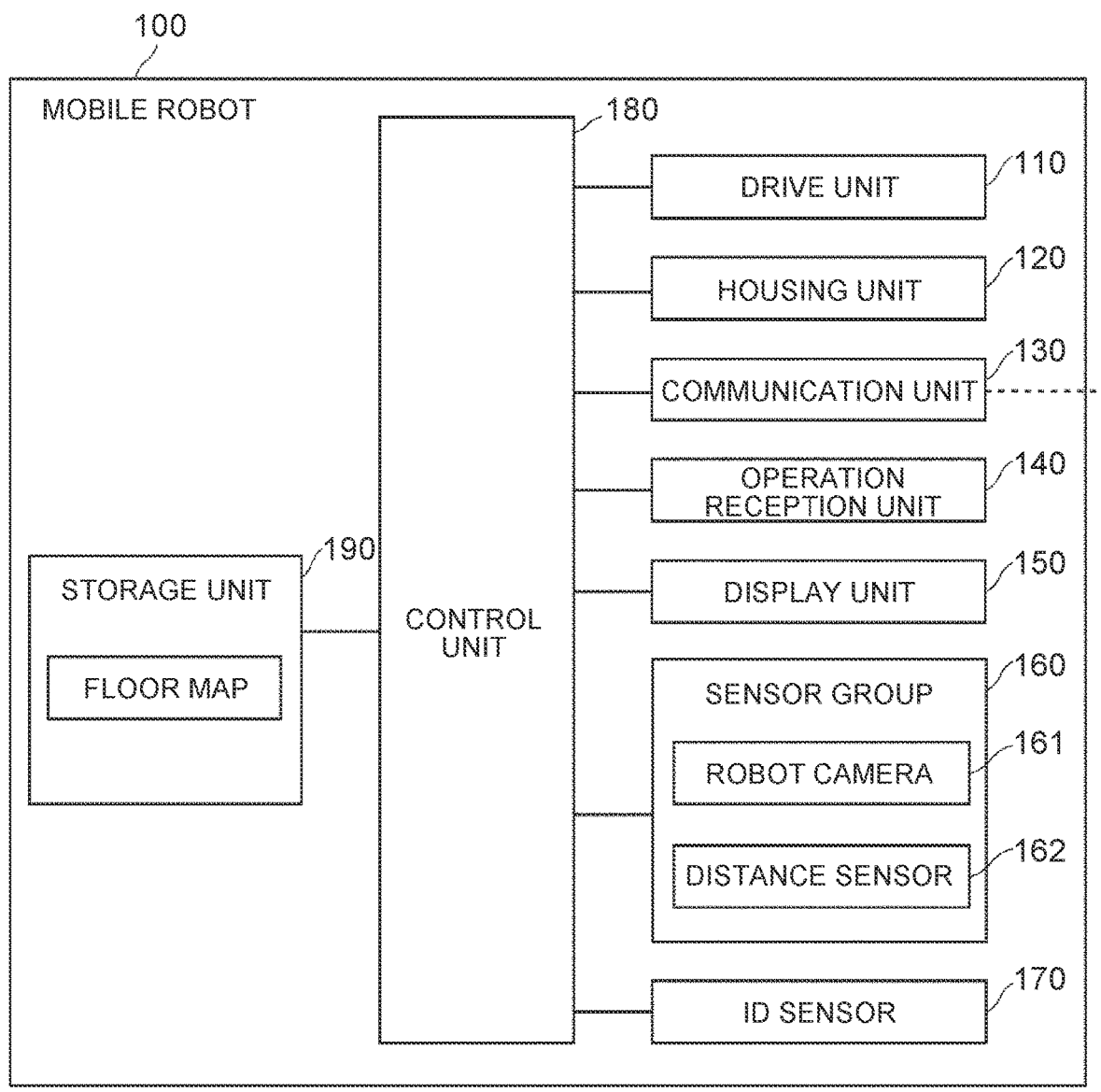
FIG. 3 is a block diagram illustrating the mobile robot according to Embodiment 1.

FIG. 3 is a block diagram illustrating the mobile robot 100 according to Embodiment 1.

As shown in FIG. 2 and FIG. 3, the mobile robot 100 includes a drive unit 110, a housing unit 120, a communication unit 130, an operation reception unit 140, a display unit 150, a sensor group 160, an ID sensor 170, a control unit 180, and a storage unit 190.

As shown in FIG. 2, the mobile robot 100 is a movable body that moves on the floor surface 910 constituting a motion surface. Here, for the convenience of describing the mobile robot 100, an XYZ orthogonal coordinate system is used. The floor surface 910 is defined as an XY-plane, and an upward direction is defined as a +Z-axis direction.

The drive unit 110 functions as moving means of the mobile robot 100. The drive unit 110 has two drive wheels 111 that are in contact with the floor surface 910 and set to be able to rotate independently of each other around one rotating shaft extending in a direction (a left-right direction or a Y-axis direction in FIG. 2) at a right angle to a direction of straight motion (a front-rear direction or an X-axis direction in FIG. 2), and casters 112 that are in contact with the floor surface. The mobile robot 100 moves forward or backward by driving the drive wheels 111, disposed on left and right sides, at the same rotation speed, and turns by causing a difference in rotation speed or rotation direction between the left and right drive wheels 111. The drive unit 110 drives the drive wheels 111 in accordance with a command from the control unit 180.

The housing unit 120 is disposed on an upper side of the drive unit 110 in the mobile robot 100. The housing unit 120 may have a storage door 121. Opening the storage door 121 reveals a storage that is provided inside the housing unit 120 to store a predetermined article to be delivered. Therefore, the mobile robot 100 can serve as a delivery robot that delivers a predetermined article. The housing unit 120 may open and close the storage door 121 in accordance with a command from the control unit 180. The mobile robot 100 is not limited to the case where it delivers an article stored inside the storage; for example, the mobile robot 100 may be provided with a placing surface or a rack and delivers an article placed on the placing surface or the rack.

As shown in FIG. 3, the communication unit 130 is an interface that communicably connects to an outside. For example, the communication unit 130 includes an antenna and a circuit that modulates or demodulates signals to be sent through the antenna. The communication unit 130 receives image data from the facility camera 400, directly or through the access point 500 and the server device 300.

The communication unit 130 may receive information about a destination, information about whether motion is possible, etc. from the server device 300. The communication unit 130 may send information about a state of the mobile robot 100, position information, travel information, etc. to the server device 300. In addition, the communication unit 130 may send and receive position information and image data to and from other mobile robots 100, directly or through the access point 500 and the server device 300.

The communication unit 130 may send a heartbeat signal to the server device 300 at regular intervals. The heartbeat signal may include log data showing the state of the mobile robot 100 in chronological order. The heartbeat signal may include an identification (ID) of the mobile robot 100 and an ID of a user who operates the mobile robot 100.

The communication unit 130 connects to the control unit 180 and outputs signals including information sent from the facility camera 400 and the server device 300 to the control unit 180, and sends signals output from the control unit 180 to the server device 300.

The operation reception unit 140 receives an input operation from the user and sends an operation signal to the control unit 180. As means for receiving an input operation from the user, the operation reception unit 140 may have, for example, operation buttons or a touch panel that is superimposed on the display unit 150. By operating such input operation means, the user performs operations such as turning the power on and off and opening and closing the storage door 121.

The display unit 150 is provided, for example, on an upper surface of the housing unit 120 so as to protrude. The display unit 150 is, for example, a display unit including a rectangular liquid crystal panel. The display unit 150 displays information as necessary in accordance with a command from the control unit 180. A touch panel for receiving an operation from the user may be superimposed on the display unit 150.

The sensor group 160 includes sensors that acquire data required for the mobile robot 100 to move autonomously. The sensor group 160 includes, for example, robot cameras 161 and distance sensors 162. The sensor group 160 may include sensors other than the robot cameras 161 and the distance sensors 162.

The robot cameras 161 are disposed, for example, at an upper part of the housing unit 120, under the display unit 150. The robot cameras 161 may be two camera units with the same angle of view that are disposed apart from each other in a horizontal direction. Images captured by each camera unit are output to the control unit 180 as image data.

When the mobile robot 100 is waiting in the elevator hall (the waiting space in front of the elevator), the robot cameras 161 may photograph this elevator hall. An image captured by the robot cameras 161 is sent to the server device 300 and another mobile robot that is, for example, about to move from the inside of the car of the elevator to the elevator hall, and is used for purposes such as determining an obstacle in the elevator hall that is visually unrecognizable by that other mobile robot. Thus, a moving route suitable for that other mobile robot to move so as to avoid the obstacle can be set beforehand.

This captured image may be used for purposes such as determining information about another mobile robot that is also waiting in the elevator hall (e.g., any positional shift and the shape of that other mobile robot, and any protrusion of the article being carried), and determining an obstacle present in an area that is located at a blind angle to that other mobile robot.

Further, when the mobile robot 100 is riding inside the car of the elevator, the robot cameras 161 may photograph the inside of the car of the elevator. An image captured by the robot cameras 161 is sent to the server device 300 and another mobile robot that is, for example, about to move from the elevator hall into the car of the elevator, and is used for purposes such as determining an obstacle inside the car of the elevator that is visually unrecognizable by that other mobile robot. Thus, a moving route suitable for that other mobile robot to move so as to avoid the obstacle can be set beforehand.

This captured image may be used for purposes such as determining information about another mobile robot that is also riding inside the car of the elevator (e.g., any positional shift and the shape of that other mobile robot, and any protrusion of the article being carried), and determining an obstacle present in an area that is located at a blind angle to that other mobile robot.

The distance sensors 162 are disposed, for example, at a lower part of the housing unit 120. The distance sensors 162 may be disposed at a lower part of each of a surface of the housing unit 120 facing a +X-axis direction, a surface thereof facing a −X-axis direction, a surface thereof facing a +Y-axis direction, and a surface thereof facing a −Y-axis direction. The distance sensors 162 measure the distance to an object around the mobile robot 100. The control unit 180 recognizes an obstacle around the mobile robot 100 and measures the distance between the mobile robot 100 and the obstacle by analyzing image data output from the robot cameras 161 and detection signals output from the distance sensors 162.

The ID sensor 170 is provided, for example, in the vicinity of the display unit 150. The ID sensor 170 serves to identify the ID of the user who operates the mobile robot 100, and detects a unique identifier included in an ID card that each user carries. For example, the ID sensor 170 includes an antenna for reading information in a wireless tag. The user who is the operator of the mobile robot 100 brings his or her ID card close to the ID sensor 170 to thereby have his or her ID recognized.

The control unit 180 is an information processing device having an arithmetic unit, such as a central processing unit (CPU). The control unit 180 includes hardware belonging to the control unit 180 and programs stored in the hardware. That is, processes executed by the control unit 180 are realized by either hardware or software.

The control unit 180 acquires various pieces of information from relevant components and gives commands to the relevant components according to the acquired information. For example, the control unit 180 detects the distance between the mobile robot 100 and an object around the mobile robot 100 from image data acquired from the facility camera 400 and the robot cameras 161, information on the object around the mobile robot 100 acquired from the distance sensors 162, etc. The control unit 180 calculates a route to a destination based on the detected distance, the position information, etc. Then, the control unit 180 gives a command to the drive unit 110 to move the mobile robot 100 along the calculated route. When executing this process, the control unit 180 refers to information about a floor map stored in the storage unit 190.

Further, when moving the mobile robot 100 from a first area to a second area through a partition configured to be openable and closable, the control unit 180 sets a moving route of the mobile robot 100 based on information about the mobile robot that is determined from an image captured by a camera that photographs the first area and an obstacle that is determined from an image captured by a camera that photographs the second area. After the partition opens, the control unit 180 causes the mobile robot 100 to move along the established moving route. Details of setting of the moving route of the mobile robot 100 and control of the motion thereof performed by the control unit 180 will be described later.

The storage unit 190 includes a non-volatile memory, such as a flash memory or a solid-state drive (SSD). The storage unit 190 stores a floor map of the facility used for the mobile robot 100 to move autonomously. The storage unit 190 is connected to the control unit 180 and outputs information stored therein to the control unit 180 upon request from the control unit 180.

As shown in FIG. 2, the side of the mobile robot 100 facing the +X-axis direction where the robot cameras 161 are installed is defined as the front side of the mobile robot 100. Thus, during normal motion, the +X-axis direction is an advancing direction as indicated by the arrow.

Various ideas can be adopted as to how to define the front side of the mobile robot 100. For example, the front side of the mobile robot 100 can be defined based on how the sensor group 160 for recognizing the surrounding environment is disposed. Specifically, one side of the housing unit 120 of the mobile robot 100 where a sensor with higher recognition performance is disposed or many sensors are disposed may be defined as the front side of the mobile robot 100. Thus defining the front side of the mobile robot 100 allows the mobile robot 100 to move while more appropriately recognizing the surrounding environment. Also for the mobile robot 100 in the embodiment, the side facing the +X-axis direction where the robot cameras 161 are disposed is defined as the front side.

Alternatively, the front side can be defined based on how the display unit 150 is disposed. If the display unit 150 displays a character's face or the like, people around the mobile robot 100 can naturally recognize that the display unit 150 forms the front side of the mobile robot 100. Therefore, defining the side of the display surface of the display unit 150 as the front side of the mobile robot 100 lessens a sense of strangeness given to people around it. Also for the mobile robot 100 in the embodiment, the side of the display surface of the display unit 150 is defined as the front side.

Further, the front side of the mobile robot 100 may be defined based on the shape of the housing of the housing unit 120. For example, when the shape of the housing unit 120 projected onto a travel surface is a rectangular shape, defining the short side as the front side is less likely to cause the mobile robot 100 to get in the way of passersby while moving than defining the long side as the front side. Thus, depending on the shape of the housing, there is a housing surface that is preferably located on the front side during normal motion. Also for the mobile robot 100 in the embodiment, the short side of the rectangular shape is defined as the front side. While the front side of the mobile robot 100 is defined in line with some ideas as has been described above, which idea to use as a basis for defining the front side should be determined with the shape, the role, etc. of a given mobile robot taken into account.

Operation of Mobile Robot

Next, the operation of the mobile robot of the embodiment will be described. For example, the user turns the power to the mobile robot 100 on. Then, the user inputs a desired task into the operation reception unit 140. When turning the power on or operating by the operation reception unit 140, the user has his or her ID identified by the ID sensor 170 if necessary.

To have an article delivered as a desired task, the user operates the operation reception unit 140 to open the storage door 121 and stores the article in the storage. Then, the user operates the operation reception unit 140 to close the storage door 121.

Next, the user inputs a destination of delivery of the article through the operation reception unit 140. Then, the control unit 180 of the mobile robot 100 searches for a route from an origin of delivery to the destination of delivery using the floor map stored in the storage unit 190. The mobile robot 100 delivers the article along the route derived from the floor map while avoiding obstacles such as installations and people. Here, it is possible that the mobile robot 100 may move inside the facility by using an elevator. In the following, the case where the mobile robot 100 moves inside the facility by using an elevator will be specifically described.

Figure 4:
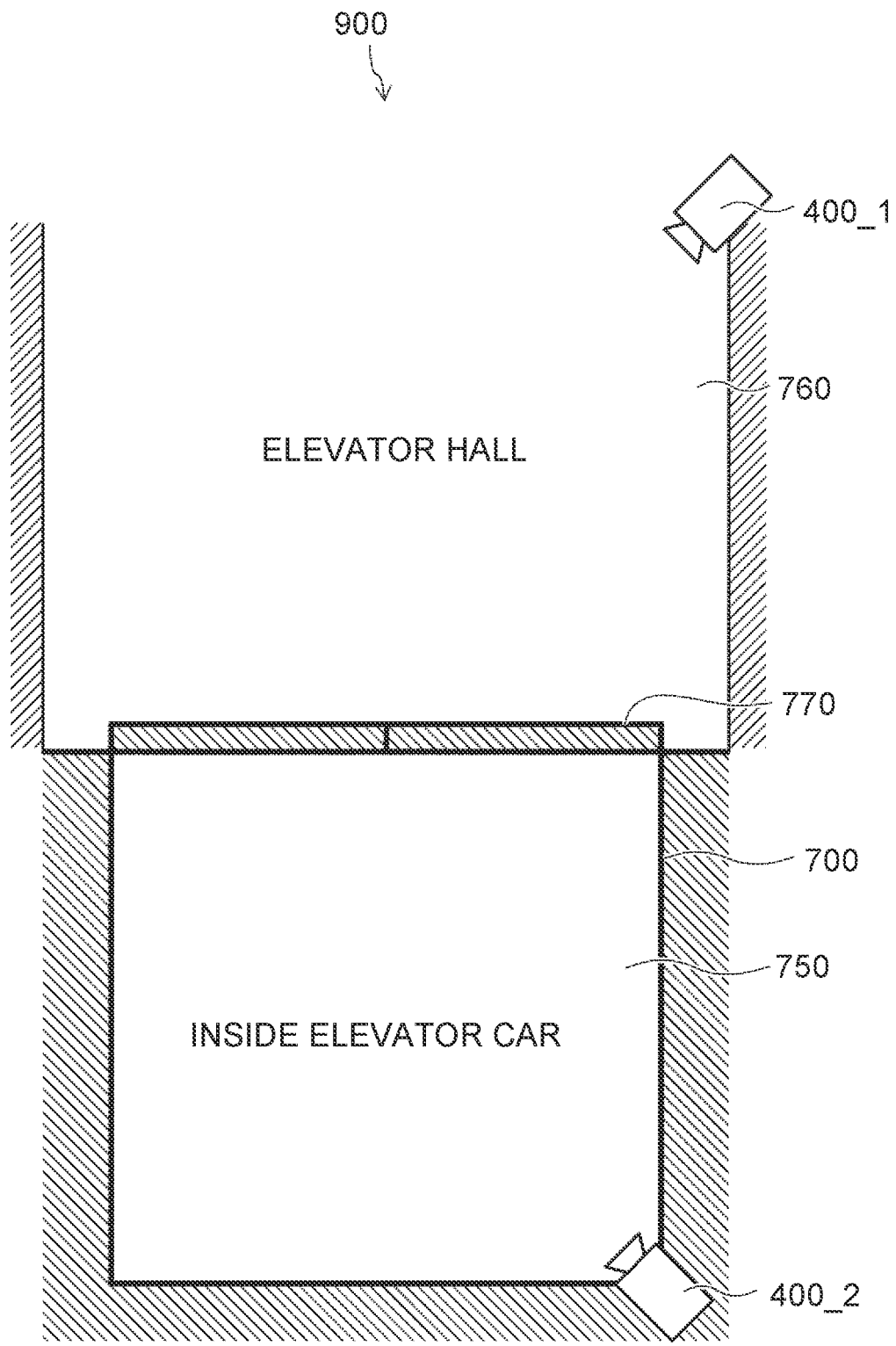
FIG. 4 is a schematic plan view illustrating an elevator and the surroundings thereof.

FIG. 4 is a schematic plan view illustrating an elevator and the surroundings thereof.

In the example of FIG. 4, a facility camera 400 (hereinafter referred to as a "facility camera 400_2") that photographs the inside of a car 750 of an elevator 700 is provided inside the car. Another facility camera 400 (hereinafter referred to as a "facility camera 400_1") that photographs an elevator hall 760 is provided in the elevator hall 760. An elevator door 770 is provided between the inside of the car 750 of the elevator 700 and the elevator hall 760.

Figure 5:
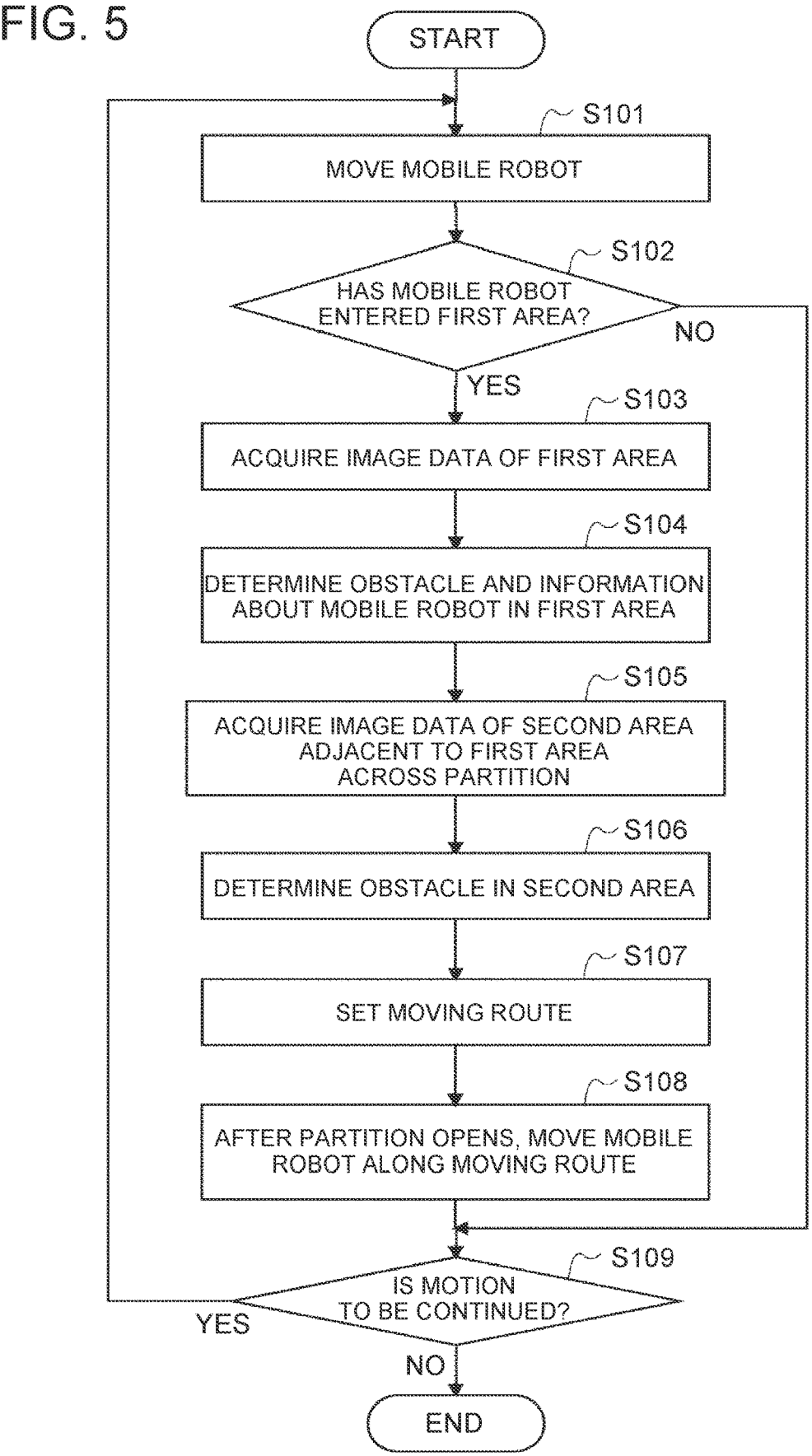
FIG. 5 is a flowchart showing one example of the operation of the mobile robot according to Embodiment 1.

FIG. 5 is a flowchart showing one example of the operation of the mobile robot 100 that uses the elevator shown in FIG. 4.

First, the mobile robot 100 starts to move along a route derived from the floor map (step S101).

The mobile robot 100 keeps moving along the route derived from the floor map until entering the elevator hall 760 (corresponding to the first area). ("NO" in step S102 to "YES" in S109 to S101).

Thereafter, when the mobile robot 100 enters the elevator hall 760 ("YES" in step S102), the mobile robot 100 acquires image data from the facility camera 400_1 that photographs the elevator hall 760 (step S103), and based on the acquired image data, determines information about the mobile robot 100 (e.g., any positional shift of the mobile robot 100, and any protrusion and the outer shape of the article being carried), and determines an obstacle in an area located at a blind angle to the mobile robot 100 (step S104). Instead of acquiring the image data from the facility camera 400_1, the mobile robot 100 may acquire image data from robot cameras (not shown) mounted on another mobile robot that photograph the elevator hall 760.

Further, the mobile robot 100 acquires image data from the facility camera 400_2 that photographs the inside of the car 750 of the elevator 700 (corresponding to the second area adjacent to the first area across the partition) (step S105), and based on the acquired image data, determines whether there is an obstacle inside the car of the elevator 700 that is visually unrecognizable by the robot cameras 161 of the mobile robot 100, and the type of the obstacle if present (step S106). Instead of acquiring the image data from the facility camera 400_2, the mobile robot 100 may acquire image data from robot cameras (not shown) mounted on another mobile robot that photograph the inside of the car of the elevator 700.

Thereafter, the mobile robot 100 searches for a suitable moving route based on the result of determination from the image data (captured images) of the facility cameras 400_1, 400_2, and sets the established moving route for the mobile robot 100 (step S107).

Thereafter, when the elevator door 770 opens, the mobile robot 100 moves from the elevator hall 760 into the car of the elevator 700 along the set moving route (step S108).

Figure 6:
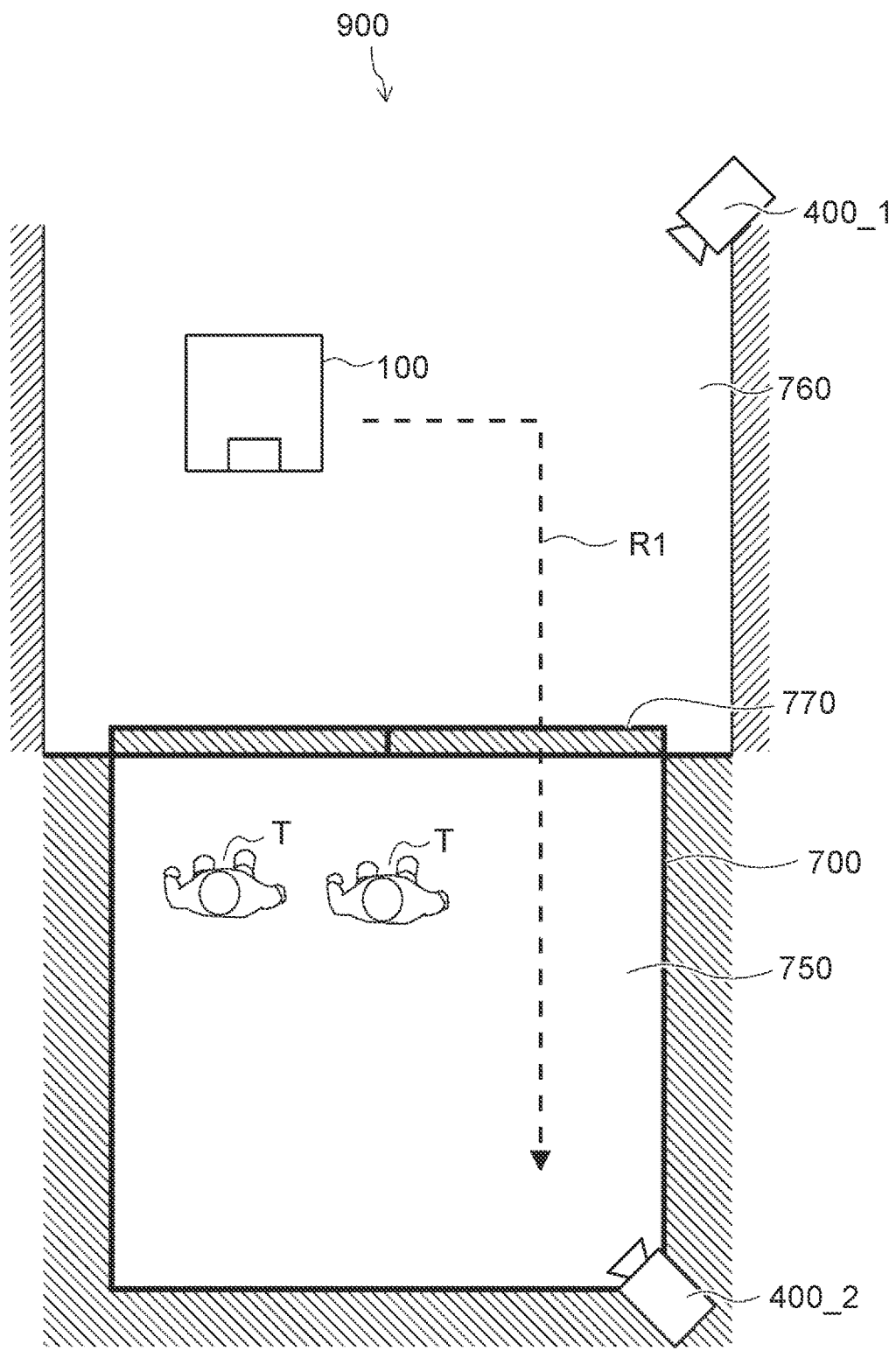
FIG. 6 is a schematic plan view showing one example of the motion of the mobile robot according to Embodiment 1 from an elevator hall into a car of the elevator.

Example of Operation when Mobile Robot Moves from Elevator Hall into Car of Elevator FIG. 6 is a schematic plan view showing one example of the motion of the mobile robot 100 from the elevator hall 760 into the car of the elevator 700.

In the example of FIG. 6, two persons T are riding inside the car of the elevator 700. Here, upon detecting that two persons T (obstacles) are riding inside the car of the elevator 700 from an image captured by the facility camera 400_2, the mobile robot 100 (more specifically, the control unit 180 provided in the mobile robot 100) searches for a moving route that allows the mobile robot 100 to move from the elevator hall 760 into the car of the elevator 700 so as to avoid these obstacles (and expected moving routes thereof), and sets an established moving route R1 for the mobile robot 100. Thus, after the elevator door 770 opens, the mobile robot 100 can move efficiently while avoiding the obstacles.

When a positional shift of the mobile robot 100, protrusion of the article being carried, etc. is detected from an image captured by the facility camera 400_1, the mobile robot 100 sets the moving route with this detection result also taken into account. Thus, the mobile robot 100 can move while avoiding the obstacles more accurately.

Figure 7:
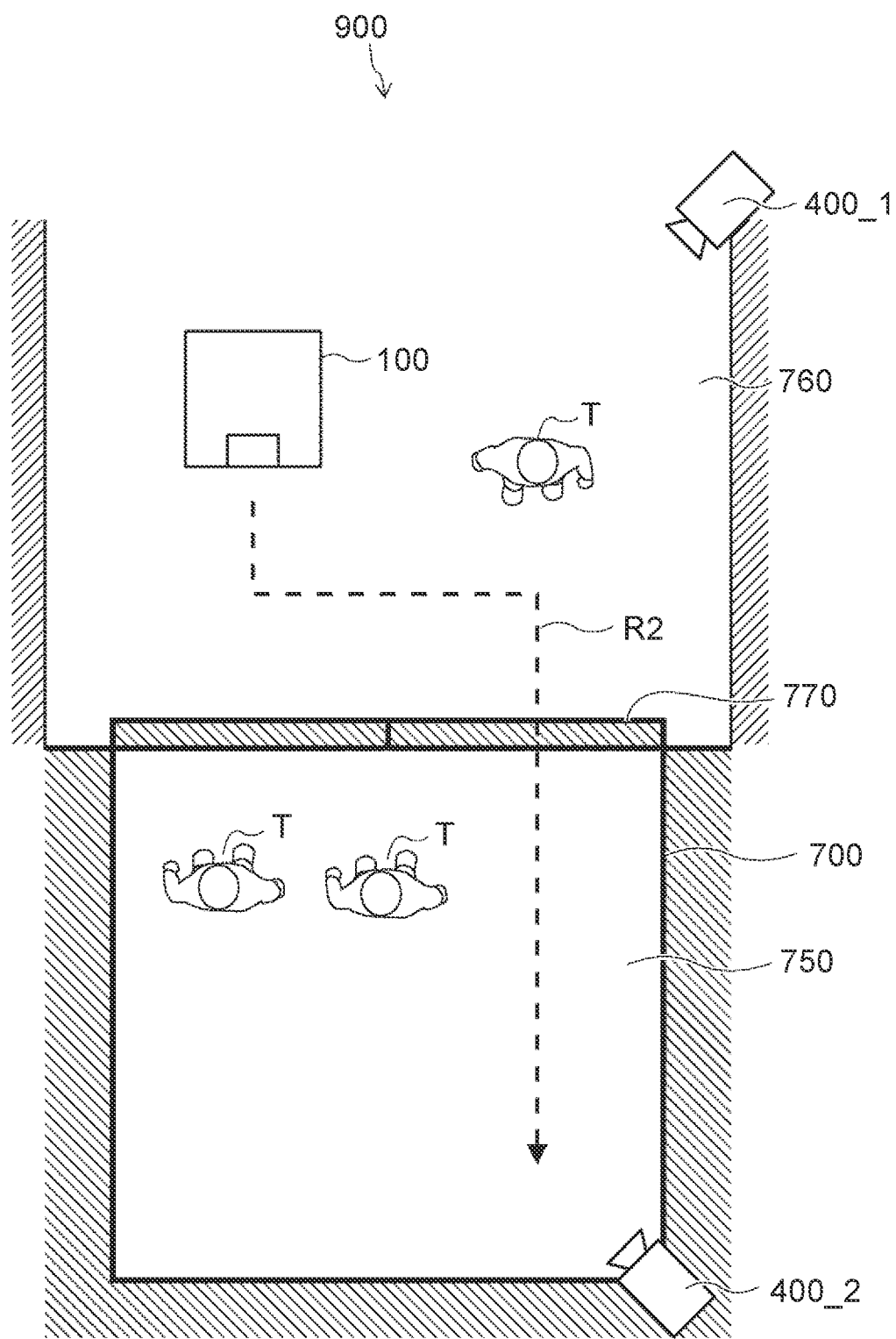
FIG. 7 is a schematic plan view showing another example of the motion of the mobile robot according to Embodiment 1 from the elevator hall into the car of the elevator.

FIG. 7 is a schematic plan view showing another example of the motion of the mobile robot 100 from the elevator hall 760 into the car of the elevator 700. In the example of FIG. 7, in addition to two persons T riding inside the car of the elevator 700, one person T is waiting in the elevator hall 760. Here, upon detecting that two persons T (obstacles) are riding inside the car of the elevator 700 from an image captured by the facility camera 400_2, and detecting that one person T (obstacle) is waiting in the elevator hall 760 from an image captured by the facility camera 400_1, the mobile robot 100 (more specifically, the control unit 180 provided in the mobile robot 100) searches for a moving route that allows the mobile robot 100 to move from the elevator hall 760 into the car of the elevator 700 so as to avoid these obstacles, and sets an established moving route R2 for the mobile robot 100. Thus, after the elevator door 770 opens, the mobile robot 100 can move efficiently while avoiding the obstacles.

When a positional shift of the mobile robot 100, protrusion of the article being carried, etc. is detected from an image captured by the facility camera 400_1, the mobile robot 100 sets the moving route with this detection result also taken into account. Thus, the mobile robot 100 can move while avoiding the obstacles more accurately.

The mobile robot 100 may have means for making it known, for example, immediately before the elevator door 770 opens, that the mobile robot 100 is going to move into the car of the elevator 700.

When an obstacle inside the car of the elevator 700 is detected to be, for example, one of a predetermined number or a larger number of people, an object occupying a predetermined proportion or a higher proportion of the area, and a predetermined object such as a stretcher on which a patient being transferred is lying, the mobile robot 100 (more specifically, the control unit 180 provided in the mobile robot 100) may remain stationary for a while after the elevator door 770 opens and start to move after the obstacle has moved from the inside of the car of the elevator 700.

When motion of the mobile robot 100 is to be continued after that ("YES" in step S109), the process from step S101 to step S109 is repeated, and when motion of the mobile robot 100 is not to be continued ("NO" in step S109), the operation of the mobile robot 100 ends. Here, the case where motion of the mobile robot 100 is continued will be described.

While riding inside the car of the elevator 700 (corresponding to the first area) (step S101 to "YES" in step S102), the mobile robot 100 acquires image data from the facility camera 400_2 that photographs the inside of the car of the elevator 700 (step S103), and based on the acquired image data, determines information about the mobile robot 100 (e.g., any positional shift of the mobile robot 100, and any protrusion and the outer shape of the article being carried), and determines an obstacle in an area located at a blind angle to the mobile robot 100 (step S104). Instead of acquiring the image data from the facility camera 400_2, the mobile robot 100 may acquire image data from robot cameras (not shown) mounted on another mobile robot that photographs the inside of the car of the elevator 700.

Further, the mobile robot 100 acquires image data from the facility camera 400_1 that photographs the elevator hall 760 (corresponding to the second area) (step S105), and based on the acquired image data, determines whether there is an obstacle in the elevator hall 760 that is visually unrecognizable by the robot cameras 161 of the mobile robot 100, and the type of the obstacle if present (step S106). Instead of acquiring the image data from the facility camera 400_1, the mobile robot 100 may acquire image data from robot cameras (not shown) mounted on another mobile robot that photograph the elevator hall 760.

Thereafter, the mobile robot 100 searches for a suitable moving route based on the result of determination from the image data (captured images) of the facility cameras 400_1, 400_2, and sets the established moving route for the mobile robot 100 (step S107).

Thereafter, when the elevator door 770 opens, the mobile robot 100 moves from the inside of the car of the elevator 700 to the elevator hall 760 along the set moving route (step S108).

Figure 8:
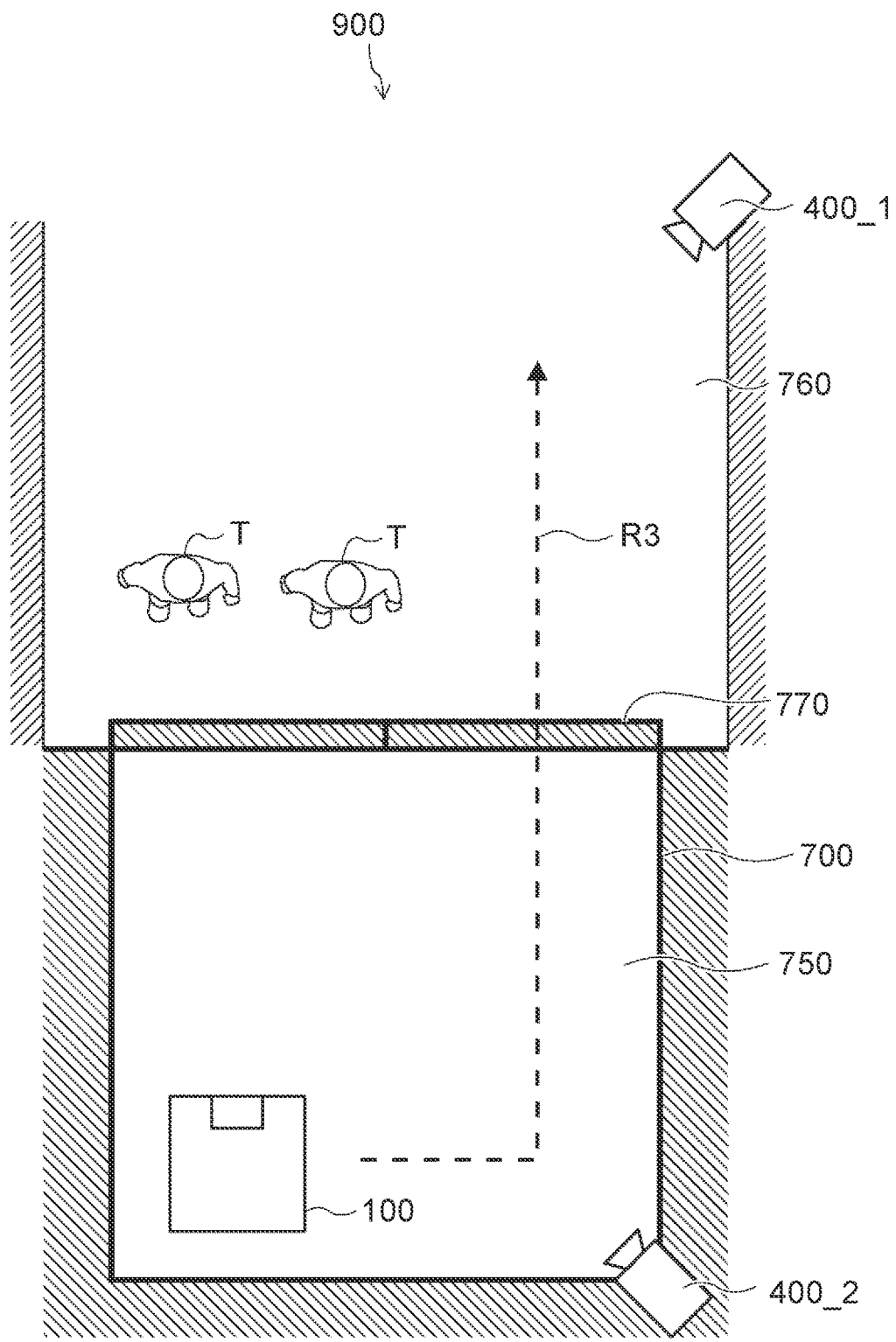
FIG. 8 is a schematic plan view showing one example of the motion of the mobile robot according to Embodiment 1 from the inside of the car of the elevator to the elevator hall.

Example of Operation when Mobile Robot Moves from Inside of Car of Elevator to Elevator Hall FIG. 8 is a schematic plan view showing one example of the motion of the mobile robot 100 from the inside of the car of the elevator 700 to the elevator hall 760.

In the example of FIG. 8, two persons T are waiting in the elevator hall 760. Here, upon detecting that two persons T (obstacles) are waiting in the elevator hall 760 from an image captured by the facility camera 400_1, the mobile robot 100 (more specifically, the control unit 180 provided in the mobile robot 100) searches for a moving route that allows the mobile robot 100 to move from the inside of the car of the elevator 700 to the elevator hall 760 so as to avoid these obstacles (and expected moving routes thereof), and sets an established moving route R3 for the mobile robot 100. Thus, after the elevator door 770 opens, the mobile robot 100 can move efficiently while avoiding the obstacles.

When a positional shift of the mobile robot 100, protrusion of the article being carried, etc. is detected from an image captured by the facility camera 400_2, the mobile robot 100 sets the moving route with this detection result also taken into account. Thus, the mobile robot 100 can move while avoiding the obstacles more accurately.

Figure 9:
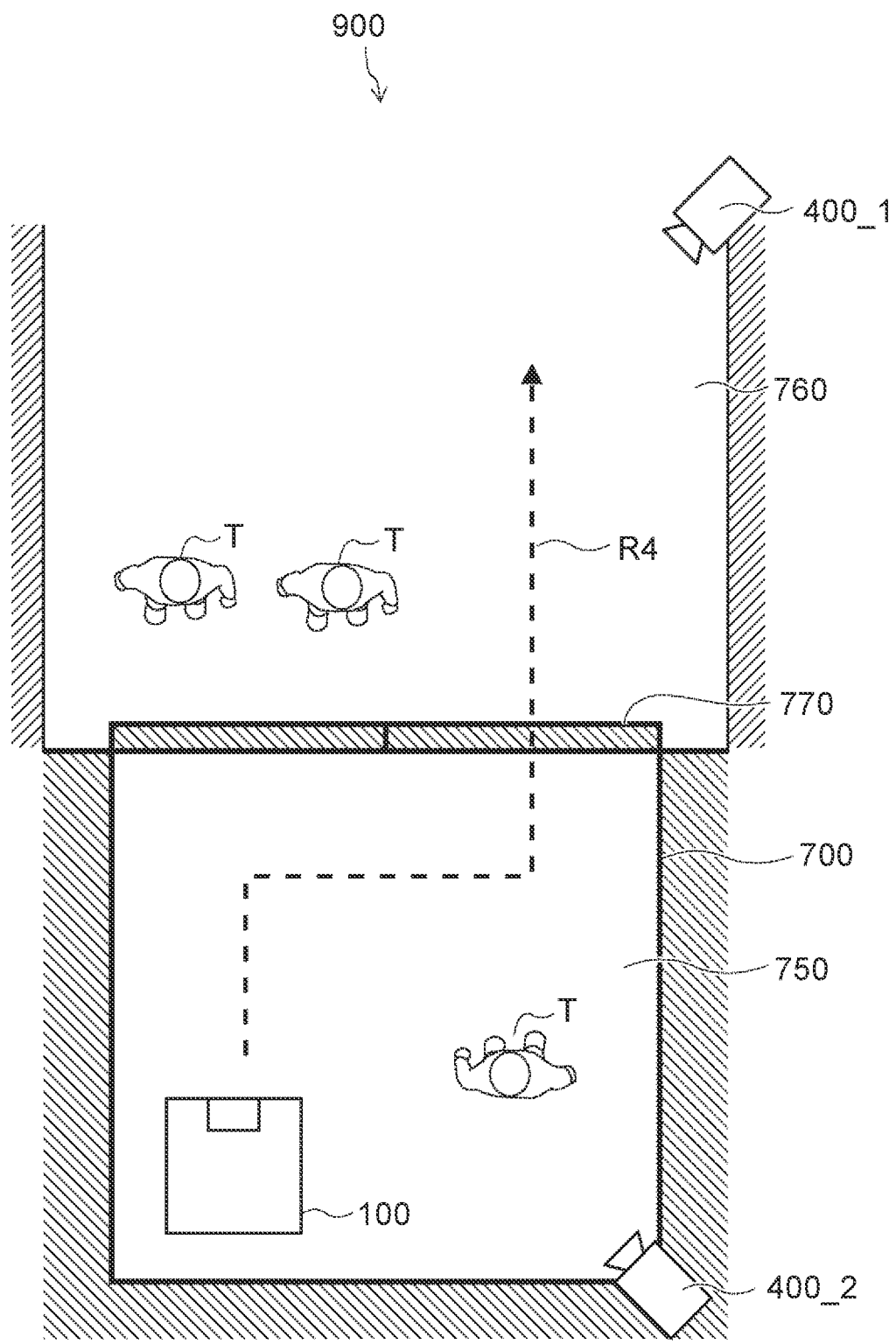
FIG. 9 is a schematic plan view showing another example of the motion of the mobile robot according to Embodiment 1 from the inside of the car of the elevator to the elevator hall.

FIG. 9 is a schematic plan view showing another example of the motion of the mobile robot 100 from the inside of the car of the elevator 700 to the elevator hall 760.

In the example of FIG. 9, in addition to two persons T waiting in the elevator hall 760, one person T is riding inside the car of the elevator 700. Here, upon detecting that two persons T (obstacles) are waiting in the elevator hall 760 from an image captured by the facility camera 400_1, and detecting that one person T (obstacle) is riding inside the car of the elevator 700 from an image captured by the facility camera 400_2, the mobile robot 100 (more specifically, the control unit 180 provided in the mobile robot 100) searches for a moving route that allows the mobile robot 100 to move from the inside of the car of the elevator 700 to the elevator hall 760 so as to avoid these obstacles, and sets an established moving route R4 for the mobile robot 100. Thus, after the elevator door 770 opens, the mobile robot 100 can move efficiently while avoiding the obstacles.

When a positional shift of the mobile robot 100, protrusion of the article being carried, etc. is detected from an image captured by the facility camera 400_2, the mobile robot 100 sets the moving route with this detection result also taken into account. Thus, the mobile robot 100 can move while avoiding the obstacles more accurately The mobile robot 100 may have means for making it known, for example, immediately before the elevator door 770 opens, that the mobile robot 100 is going to move to the elevator hall 760.

When an obstacle in the elevator hall 760 is detected to be, for example, one of a predetermined number or a larger number of people, an object occupying a predetermined proportion or a higher proportion of the area, and a predetermined object such as a stretcher on which a patient being transferred is lying, the mobile robot 100 (more specifically, the control unit 180 provided in the mobile robot 100) may remain stationary for a while after the elevator door 770 opens and start to move after the obstacle has moved from the elevator hall 760.

When motion of the mobile robot 100 is to be continued after that ("YES" in step S109), the process from step S101 to step S109 is repeated, and when motion of the mobile robot 100 is not to be continued ("NO" in step S109), the operation of the mobile robot 100 ends.

In this way, the mobile robot 100 according to this embodiment can determine an obstacle in the second area that is visually unrecognizable by the built-in robot cameras 161 of the mobile robot 100 from an image captured by the second camera that photographs the second area. Therefore, a moving route that allows the mobile robot 100 to move from the first area to the second area so as to avoid the obstacle can be set for the mobile robot 100 beforehand. Further, the mobile robot 100 according to this embodiment can accurately grasp information about the mobile robot 100 located in the first area (e.g., any positional shift, and any protrusion and the outer shape of the article being carried) from an image captured by the first camera that photographs the first area. Therefore, a more accurate moving route suitable for the mobile robot 100 to move so as to avoid the obstacle can be set for the mobile robot 100. Thus, the mobile robot 100 according to this embodiment can move efficiently while avoiding obstacles.

In this embodiment, setting of the moving route in each of the case where the mobile robot 100 moves from the inside of the car of the elevator to the elevator hall and the case where the mobile robot 100 moves from the elevator hall to the inside of the car of the elevator has been described, but this disclosure is not limited to these cases. For example, the same technique can be used also for setting a moving route in a case where the mobile robot 100 moves from a first area to a second area adjacent to the first area across a security door, a toilet door, or the like.

Embodiment 2

Next, a robot control system according to Embodiment 2 will be described. In this embodiment, a case where the robot control system includes one or more mobile robots and a server device (control device) that manages (controls) these mobile robots will be described.

Specifically, the robot control system includes one or more mobile robots 100 and a server device 300. The configuration of the mobile robot 100 is the same as the configuration described in Embodiment 1 and therefore the description thereof will be omitted.

The mobile robot 100 according to this embodiment may be such that some of the functions of the mobile robot 100 according to Embodiment 1 are fulfilled by the server device 300. For example, the server device 300 may be configured to acquire images captured by the facility camera and the robot cameras, to perform image analysis on acquired captured images, to determine information about an obstacle and the mobile robot (any positional shift of the mobile robot, protrusion of the article being carried, etc.) through image analysis, to set the moving route of one or more mobile robots 100, and to control the motion thereof.

The server device 300 is, for example, a computer having a communication function. The server device 300 may be installed at any place where it can communicate with relevant components of the robot control system. The server device 300 sends and receives position information, travel information, etc. on the mobile robot 100.

Figure 10:
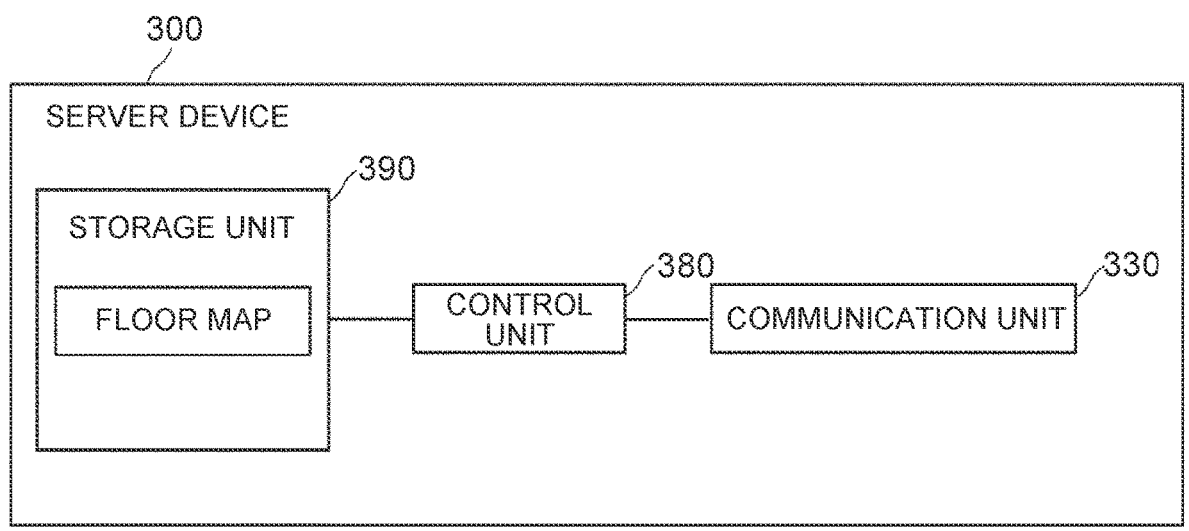
FIG. 10 is a block diagram illustrating a server device provided in a robot control system according to Embodiment 2.

FIG. 10 is a block diagram illustrating the server device provided in the robot control system according to Embodiment 2. As shown in FIG. 10, the server device 300 has a communication unit 330, a control unit 380, and a storage unit 390.

The communication unit 330 individually communicates with each mobile robot 100. The communication unit 330 outputs signals received from relevant components to the control unit 380. The communication unit 330 sends signals output from the control unit 380 to the relevant components as necessary. The communication unit 330 may include a router device to allow communication between the server device 300 and a plurality of components. To allow communication between the server device 300 and the components, the communication unit 330 may have different communication means for each different constituent element to communicate with. The communication unit 330 may be connected to the components so as to be able to communicate with them through intranet lines or Internet lines.

The control unit 380 includes an arithmetic unit, such as a CPU, as a component and performs various types of information processing. The control unit 380 may be configured to acquire images captured by the facility camera and the robot cameras, to perform image analysis on acquired captured images, to determine information about an obstacle and the mobile robot (any positional shift of the mobile robot, protrusion of the article being carried, etc.) through image analysis, to set the moving route of one or more mobile robots 100, and to control the motion thereof.

The storage unit 390 includes a non-volatile memory, such as a flash memory or an SSD. The storage unit 390 stores a floor map of the facility used for the mobile robot 100 to move autonomously. The storage unit 390 is connected to the control unit 380 and outputs information stored therein to the control unit 380 upon request from the control unit 380.

FIG. 11 is a sequence chart illustrating the operation of the robot control system according to Embodiment 2. In the example of FIG. 11, a case where the server device 300 controls the motion of one mobile robot 100 will be described. However, this disclosure is not limited to this case, and the server device 300 may control the motion of a plurality of mobile robots 100.

As shown in FIG. 11, the server device 300 commands the mobile robot 100 to move (step S201). For example, the server device 300 commands the mobile robot 100 to deliver an article to a destination. In this case, the server device 300 searches for a route from the current position of the mobile robot 100 to the origin of delivery of the article, and a route from the origin of delivery of the article to the destination (destination of delivery), and sends information on the established routes to the mobile robot 100. It is assumed that the established routes include a route that uses the elevator 700 as shown in FIG. 4.

Then, the mobile robot 100 moves in accordance with the command from the server device 300 (step S202). For example, the mobile robot 100 moves from the current position to the origin of delivery of the article along the specified route, and after receiving the article, delivers the article to the destination along the specified route.

Here, upon detecting entry of the mobile robot 100 into elevator hall 760 (corresponding to the first area) (step S203), the server device 300 requests image data (captured image) from the facility camera 400_1 that photographs the elevator hall 760 (step S204). Then, the facility camera 400_1 sends the image data to the server device 300 (step S205). From the image data of the facility camera 400_1, the server device 300 determines information about the mobile robot 100 (e.g., any positional shift, and any protrusion and the outer shape of the article being carried) and determines an obstacle in an area located at a blind angle to the mobile robot 100 (step S206).

Further, the server device 300 requests image data (captured image) from the facility camera 400_2 that photographs the inside of the car 750 of the elevator 700 (corresponding to the second area) (step S207). Then, the facility camera 400_2 sends the image data to the server device 300 (step S208). From the captured image of the facility camera 400_2, the server device 300 determines whether there is an obstacle inside the car of the elevator 700 that is visually unrecognizable by the built-in robot cameras 161 of the mobile robot 100, and the type of the obstacle if present (step S209).

Thereafter, the server device 300 searches for a suitable moving route based on the result of determination from the image data (captured images) of the facility cameras 400_1, 400_2, and sets the established moving route for the mobile robot 100 (step S210).

Then, when the elevator door 770 opens, the mobile robot 100 moves from the elevator hall 760 into the car of the elevator 700 along the set moving route (step S211).

The flow of the motion of the mobile robot 100 from the inside of the car of the elevator 700 to the elevator hall 760 is basically the same as the flow of the motion of the mobile robot 100 from the elevator hall 760 into the car of the elevator 700, except that the roles of the facility cameras 400_1, 400_2 are reversed, and therefore description thereof will be omitted.

In this way, in the robot control system according to this embodiment, an obstacle in the second area that is visually unrecognizable by the built-in robot cameras 161 of the mobile robot 100 can be determined from an image captured by the second camera that photographs the second area. Therefore, a moving route that allows the mobile robot 100 to move from the first area to the second area so as to avoid the obstacle can be set for the mobile robot 100 beforehand. Further, in the robot control system according to this embodiment, information about the mobile robot 100 located in the first area (e.g., any positional shift, and any protrusion and the outer shape of the article being carried) can be accurately grasped from an image captured by the first camera that photographs the first area. Therefore, a more accurate moving route suitable for the mobile robot 100 to move so as to avoid the obstacle can be set for the mobile robot 100. Thus, the robot control system according to this embodiment can allow the mobile robot 100 to move efficiently while avoiding obstacles.

In this embodiment, setting of the moving route in each of the case where the mobile robot 100 moves from the inside of the car of the elevator to the elevator hall and the case where the mobile robot 100 moves from the elevator hall into the car of the elevator has been described, but this disclosure is not limited to these cases. For example, the same technique can be used also for setting a moving route in a case where the mobile robot 100 moves from a first area to a second area adjacent to the first area across a security door, a toilet door, or the like.

The present disclosure is not limited to the above-described embodiments but can be changed as necessary within a range that does not depart from the gist of the disclosure. For example, a combination of some components of Embodiments 1 and 2 is also included in the scope of the technical idea of the embodiments. Further, an autonomous motion method and an autonomous motion program to be shown below are also included in the scope of the technical idea of the embodiments.

Moreover, in this disclosure, some or all of the processes executed in the mobile robot 100 and the server device 300 may be realized by causing a central processing unit (CPU) to execute a computer program.

This program can be stored using various types of non-transitory computer-readable media and supplied to a computer. These non-transitory computer-readable media include various types of tangible storage media. Examples of non-transitory computer-readable media include a magnetic recording medium, a magneto-optical recording medium, a compact disc read-only memory (CD-ROM), a CD-R, a CD-R/W, and a semiconductor memory. Examples of magnetic recording media include a flexible disc, a magnetic tape, and a hard disk drive. One example of magneto-optical recording media is a magneto-optical disc. Examples of semiconductor memories include a mask ROM, a programmable ROM (PROM), an erasable PROM (EPROM), a flash ROM, and a random-access memory (RAM). Further, the program may be supplied to a computer by various types of transitory computer-readable media. Examples of transitory computer-readable media include electrical signals, optical signals, and electromagnetic waves. The transitory computer-readable medium can supply the program to a computer through a wired communication channel, such as an electric wire or an optical fiber, or a wireless communication channel.

The present disclosure is not limited to the above-described embodiments but can be changed as necessary within a scope that does not depart from the gist of the disclosure. For example, a combination of some components of Embodiments 1 and 2 is also included in the scope of the technical idea of the embodiments. In addition, a robot control method and a control program to be shown below are also included in the scope of the technical idea of the embodiments.

Additional Statement 1

A robot control method including the steps of:
determining a mobile robot configured to be able to move autonomously that is present in a first area inside a facility, from an image captured by a first camera that photographs the first area;
determining an obstacle in a second area that is adjacent to the first area across a partition configured to be openable and closable, from an image captured by a second camera that photographs the second area; and setting a moving route of the mobile robot from the first area to the second area through the partition based on a result of determination in each of the first area and the second area.

Additional Statement 2

The robot control method according to Additional Statement 1, wherein, in the step of setting the moving route, the moving route of the mobile robot is set based on at least one of the position of the mobile robot, the shape of the mobile robot, and an article being carried by the mobile robot that are determined from an image captured by the first camera, and on an obstacle that is determined from an image captured by the second camera that photographs the second area.

Additional Statement 3

The robot control method according to Additional Statement 1 or 2, wherein, in the step of setting the moving route, the moving route of the mobile robot is set based on the mobile robot determined from an image captured by the first camera and an obstacle determined from an image captured by the second camera, and additionally on an obstacle in the first area that is determined from an image captured by the first camera.

Additional Statement 4

The robot control method according to any one of Additional Statements 1 to 3, wherein one or both of the first camera and the second camera are cameras that are installed inside the facility.

Additional Statement 5

The robot control method according to any one of Additional Statements 1 to 4, wherein one or both of the first camera and the second camera are cameras that are mounted on a mobile robot other than the mobile robot.

Additional Statement 6

The robot control method according to any one of Additional Statements 1 to 5, wherein, in the step of setting the moving route, the moving route of the mobile robot is set so as to avoid an obstacle determined from an image captured by the second camera and an expected moving route of the obstacle.

Additional Statement 7

The robot control method according to any one of Additional Statements 1 to 6, wherein the mobile robot is stopped from moving to the second area when an obstacle determined from an image captured by the second camera is a predetermined number or a larger number of people.

Additional Statement 8

The robot control method according to any one of Additional Statements 1 to 6, wherein the mobile robot is stopped from moving to the second area when an obstacle determined from an image captured by the second camera is an object that occupies a predetermined proportion or a higher proportion of the second area.

Additional Statement 9

The robot control method according to any one of Additional Statements 1 to 6, wherein the mobile robot is stopped from moving to the second area when an obstacle determined from an image captured by the second camera is a predetermined obstacle.

Additional Statement 10

The robot control method according to any one of Additional Statements 7 to 9, wherein the mobile robot is moved to the second area when the obstacle has moved to the outside of the second area.

Additional Statement 11

The robot control method according to any one of Additional Statements 1 to 10, wherein the first area is the inside of a car of an elevator; the second area is an elevator hall in front of the elevator; and the partition is a door of the elevator.

Additional Statement 12

The robot control method according to any one of Additional Statements 1 to 10, wherein the first area is an elevator hall in front of an elevator; the second area is the inside of a car of the elevator; and the partition is a door of the elevator.

Additional Statement 13

The robot control method according to any one of Additional Statements 1 to 12, wherein, when an obstacle determined from an image captured by the second camera is a person, the method notifies the person that the mobile robot is going to move to the second area.

Additional Statement 14

A control program that causes a computer to execute:
a process of determining a mobile robot configured to be able to move autonomously that is present in a first area inside a facility, from an image captured by a first camera that photographs the first area;
a process of determining an obstacle in a second area that is adjacent to the first area across a partition configured to be openable and closable, from an image captured by a second camera that photographs the second area; and
a process of setting a moving route of the mobile robot from the first area to the second area through the partition based on a result of determination in each of the first area and the second area.

Additional Statement 15

The control program according to Additional Statement 14, wherein, in the process of setting the moving route, the moving route of the mobile robot is set based on at least one of the position of the mobile robot, the shape of the mobile robot, and an article being carried by the mobile robot that is determined from an image captured by the first camera, and on an obstacle that is determined from an image captured by the second camera that photographs the second area.

Additional Statement 16

The control program according to Additional Statement 14 or 15, wherein, in the process of setting the moving route, the moving route of the mobile robot is set based on the mobile robot determined from an image captured by the first camera and an obstacle determined from an image captured by the second camera, and additionally on an obstacle in the first area that is determined from an image captured by the first camera.

Additional Statement 17

The control program according to any one of Additional Statements 14 to 16, wherein one or both of the first camera and the second camera are cameras that are installed inside the facility.

Additional Statement 18

The control program according to any one of Additional Statements 14 to 17, wherein one or both of the first camera and the second camera are cameras that are mounted on a mobile robot other than the mobile robot.

Additional Statement 19

The control program according to any one of Additional Statements 14 to 18, wherein, in the process of setting the moving route, the moving route of the mobile robot is set so as to avoid an obstacle determined from an image captured by the second camera and an expected moving route of the obstacle.

Additional Statement 20

The control program according to any one of Additional Statements 14 to 19, wherein the mobile robot is stopped from moving to the second area when an obstacle determined from an image captured by the second camera is a predetermined number or a larger number of people.

Additional Statement 21

The control program according to any one of Additional Statements 14 to 19, wherein the mobile robot is stopped from moving to the second area when an obstacle determined from an image captured by the second camera is an object that occupies a predetermined proportion or a higher proportion of the second area.

Additional Statement 22

The control program according to any one of Additional Statements 14 to 19, wherein the mobile robot is stopped from moving to the second area when an obstacle determined from an image captured by the second camera is a predetermined obstacle.

Additional Statement 23

The control program according to any one of Additional Statements 20 to 22, wherein the mobile robot is moved to the second area when the obstacle has moved to the outside of the second area.

Additional Statement 24

The control program according to any one of Additional Statements 14 to 23, wherein the first area is the inside of a car of an elevator; the second area is an elevator hall in front of the elevator; and the partition is a door of the elevator.

Additional Statement 25

The control program according to any one of Additional Statements 14 to 23, wherein the first area is an elevator hall in front of an elevator; the second area is the inside of a car of the elevator; and the partition is a door of the elevator.

Additional Statement 26

The control program according to any one of Additional Statements 14 to 25, wherein, when an obstacle determined from an image captured by the second camera is a person, the method notifies the person that the mobile robot is going to move to the second area.

What is claimed is:

1. A robot control system that controls a mobile robot configured to be able to move autonomously inside a facility, wherein, when the mobile robot moves from a first area inside the facility to a second area through a partition configured to be openable and closable, a moving route of the mobile robot is set based on the mobile robot that is determined from an image captured by a first camera that photographs the first area and an obstacle that is determined from an image captured by a second camera that photographs the second area;

the robot control system further comprising a control device that controls the mobile robot, wherein when moving the mobile robot from the first area inside the facility to the second area through the partition configured to be openable and closable, the control device sets the moving route of the mobile robot based on a position of the mobile robot that is determined from an image captured by the first camera that photographs the first area and a position of the obstacle that is determined from an image captured by the second camera;

wherein the control device sets the moving route of the mobile robot before the partition opens;

wherein, when the partition opens, the control device controls the mobile robot to move from the first area to the second area along the set moving route;

wherein the moving route is set so as to avoid the obstacle determined from an image captured by the second camera and an expected moving route of the obstacle;

wherein the mobile robot is further configured to move automatically according to the set moving route;

wherein the first camera and the second camera are cameras that are installed inside the facility;

wherein the first area is an inside of a car of an elevator; the second area is an elevator hall in front of the elevator; and the partition is a door of the elevator; and wherein the moving route of the mobile robot is set based on a position of the mobile robot, a shape of the mobile robot, and an article being carried by the mobile robot that are determined from an image captured by the first camera, and on the obstacle that is determined from an image captured by the second camera that photographs the second area.

2. The robot control system according to claim 1, wherein the moving route of the mobile robot is set based on the mobile robot determined from an image captured by the first camera and the obstacle determined from an image captured by the second camera, and additionally on an obstacle in the first area that is determined from an image captured by the first camera.

3. The robot control system according to claim 1, wherein the mobile robot is stopped from moving to the second area when the obstacle determined from an image captured by the second camera is a predetermined number or a larger number of people.

4. The robot control system according to claim 3, wherein the mobile robot is moved to the second area when the obstacle has moved to an outside of the second area.

5. The robot control system according to claim 1, wherein the mobile robot is stopped from moving to the second area when the obstacle determined from an image captured by the second camera is an object that occupies a predetermined proportion or a higher proportion of the second area.

6. The robot control system according to claim 1, wherein the mobile robot is stopped from moving to the second area when the obstacle determined from an image captured by the second camera is a predetermined obstacle.

7. The robot control system according to claim 1, wherein, when the obstacle determined from an image captured by the second camera is a person, the person is notified that the mobile robot is going to move to the second area.

8. The robot control system of claim 1, wherein the image captured by the first camera that photographs the first area is used for determining information about the mobile robot, wherein the information comprises a positional shift, and a protrusion of and the outer shape of the article being carried.

9. The robot control system of claim 1, wherein the control device further controls the robot to remain stationary until the obstacle has moved from the second area to the first area before beginning to move along the set moving route.

10. The robot control system of claim 9, wherein the obstacle is a person.

11. The robot control system of claim 10, wherein the obstacle is a person riding on a stretcher and the facility is a hospital.

12. A robot control method comprising the steps of:
determining a mobile robot configured to be able to move autonomously that is present in a first area inside a facility, from an image captured by a first camera that photographs the first area;
determining an obstacle in a second area that is adjacent to the first area across a partition configured to be openable and closable, from an image captured by a second camera that photographs the second area;
setting a moving route of the mobile robot from the first area to the second area through the partition based on a result of determination in each of the first area and the second area;
setting the moving route of the mobile robot before the partition opens based on a position of the mobile robot that is determined from an image captured by the first camera that photographs the first area and a position of the obstacle that is determined from an image captured by the second camera;
setting the moving route so as to avoid the obstacle determined from an image captured by the second camera and an expected moving route of the obstacle;
when the partition opens, moving the mobile robot automatically according to the set moving route to move from the first area to the second area along the set moving route;
wherein the first camera and the second camera are cameras that are installed inside the facility;
wherein the first area is an inside of a car of an elevator; the second area is an elevator hall in front of the elevator; and the partition is a door of the elevator; and
wherein the moving route of the mobile robot is set based on a position of the mobile robot, a shape of the mobile robot, and an article being carried by the mobile robot that are determined from an image captured by the first camera, and on the obstacle that is determined from an image captured by the second camera that photographs the second area.

13. A control program stored on a computer readable tangible medium that causes a computer to execute:
a process of determining a mobile robot configured to be able to move autonomously that is present in a first area inside a facility, from an image captured by a first camera that photographs the first area;
a process of determining an obstacle in a second area that is adjacent to the first area across a partition configured to be openable and closable, from an image captured by a second camera that photographs the second area;
a process of setting a moving route of the mobile robot from the first area to the second area through the partition based on a result of determination in each of the first area and the second area;
a process of setting the moving route of the mobile robot before the partition opens based on a position of the mobile robot that is determined from an image captured by the first camera that photographs the first area and a position of the obstacle that is determined from an image captured by the second camera;
a process of setting the moving route so as to avoid the obstacle determined from an image captured by the second camera and an expected moving route of the obstacle;
a process of, when the partition opens, moving the mobile robot automatically according to the set moving route to move from the first area to the second area along the set moving route;
wherein the first camera and the second camera are cameras that are installed inside the facility;
wherein the first area is an inside of a car of an elevator; the second area is an elevator hall in front of the elevator; and the partition is a door of the elevator; and
wherein the moving route of the mobile robot is set based on a position of the mobile robot, a shape of the mobile robot, and an article being carried by the mobile robot that are determined from an image captured by the first camera, and on the obstacle that is determined from an image captured by the second camera that photographs the second area.

* * * * *